Feb. 18, 1936.  H. BUDD  2,031,031

DEVICE FOR DELIVERING MEASURED QUANTITIES OF LIQUIDS

Filed Feb. 21, 1934  2 Sheets-Sheet 1

INVENTOR
Harry Budd
BY
ATTORNEY

Feb. 18, 1936.    H. BUDD    2,031,031
DEVICE FOR DELIVERING MEASURED QUANTITIES OF LIQUIDS
Filed Feb. 21, 1934    2 Sheets-Sheet 2

INVENTOR
Harry Budd.
BY
ATTORNEY

Patented Feb. 18, 1936

2,031,031

UNITED STATES PATENT OFFICE 2,031,031

DEVICE FOR DELIVERING MEASURED QUANTITIES OF LIQUIDS

Harry Budd, Old Charlton, London, England

Application February 21, 1934, Serial No. 712,383
In Great Britain February 25, 1933

3 Claims. (Cl. 221—114)

This invention relates to devices for delivering measured quantities of liquids, and it has for its object the provision of a device of simple construction and cheap to produce, and to this end the device according to this invention comprises a delivery tube adapted to be fitted to the outlet aperture of a liquid container, a measuring vessel having a limited sliding movement arranged on said delivery tube, means for forming an airtight joint between said delivery tube and measuring vessel, a spring controlled valve in said vessel coaxially arranged with respect to said delivery tube and means carried by said valve adapted to coact with and close the inner end of said delivery tube.

In the accompanying drawings which illustrate this invention:—

Figure 1:
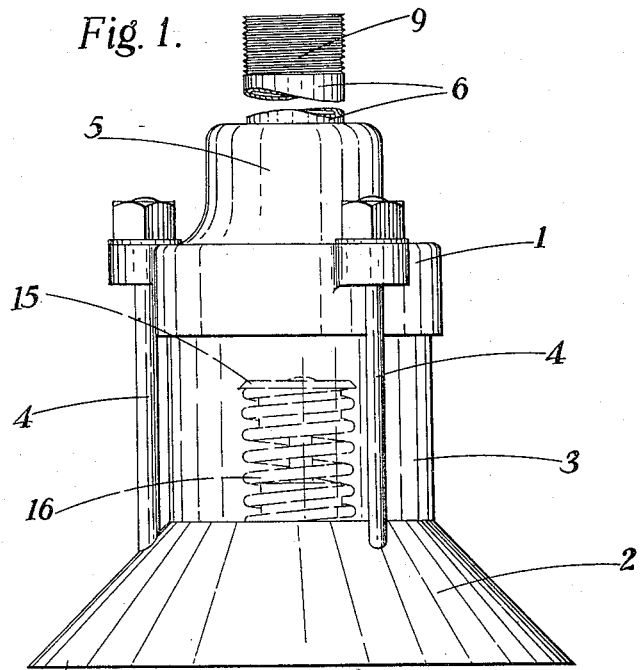
Figure 1 is an elevation of one embodiment.
Figure 2:
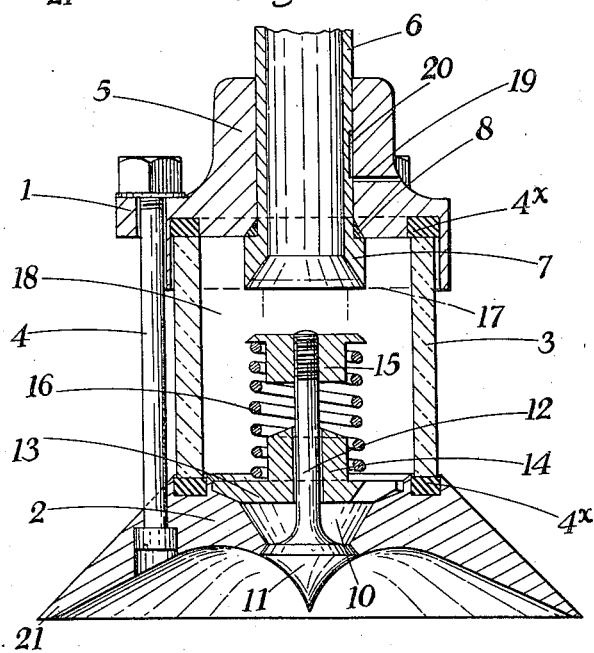
Figure 2 is a vertical section thereof.

In the embodiment illustrated in Figures 1 and 2 the device consists of two end plates 1 and 2 spaced apart by a cylindrical member 3 preferably of glass, the three parts being held in assembled relation relatively to each other by means of three bolts 4, packing rings 4× being interposed between the member 3 and end plates 1 and 2 to produce a liquid-tight joint. The upper end plate 1 is furnished with an upwardly directed extension or part 5 and is slidably mounted on a delivery tube 6 provided at its lower end with an annular ring or part 7, a leather or other suitable washer 8 being interposed between the upper part of said ring and the chambered aperture in the plate 1. The other end of the delivery tube 6 which may be of any desired length is provided with any suitable means, such as the screw thread 9, for enabling same to be secured to the outlet aperture of an otherwise closed liquid container. The lower end plate 2 is provided with a centrally disposed aperture 10, the lower end of which is cone-shaped and constitutes a seat for a valve 11, the stem 12 of which is upwardly directed and slidably supported in a spider plate 13 furnished with a centrally disposed boss 14. The upper end of the valve stem 12 is screw threaded and is provided with an adjustable stop-member 15, a spring 16 being interposed between said part and the upper face of the spider plate 13, the action of which is to draw the valve 11 against its seat.

In operation the liquid being measured fills the device up to the lower edge of the ring 7 as indicated by the line 17; when it is desired to discharge the liquid therefrom, a suitable vessel is placed against the underside of the end plate 2 and pushed upwardly so that the end plate 1 is caused to slide on the delivery tube 6. Air is admitted into the chamber 18 through the vent hole 19 in the part 5 and slot 20 in the pipe 6 and simultaneously the upper end of the chamfered aperture in the plate 1 coincides with the lower end of the slot 20, and simultaneously the upper end of the stop-member 15 comes into contact with and closes the lower end of the delivery tube 6; further upward movement of the measuring vessel effects the opening of the valve and the liquid is discharged. On the removal of the vessel into which the liquid has been discharged, the valve 11 is first forced onto its seat and the stop-member 15 falls away from the ring 7 thereby permitting further liquid to flow into the chamber 18, the air contained in the said chamber passing up the pipe 6 into the main closed liquid container, until said liquid reaches the lower edge of the ring 7 when it will automatically stop in the well known manner.

The lower end plate 2 may, if desired, be formed approximately flat and of the same shape as the plate 1 in which case when in use the measuring vessel may be pushed up by one hand while the vessel to receive the liquid is held by the other, but said end plate 2 is preferably shaped as shown with an outwardly extending edge 21, or radially extending fingers or other means may be provided so as to enable the device to be operated, if desired, by one hand when the vessel designed to receive the liquid is pressed up against said plate.

Figure 3:
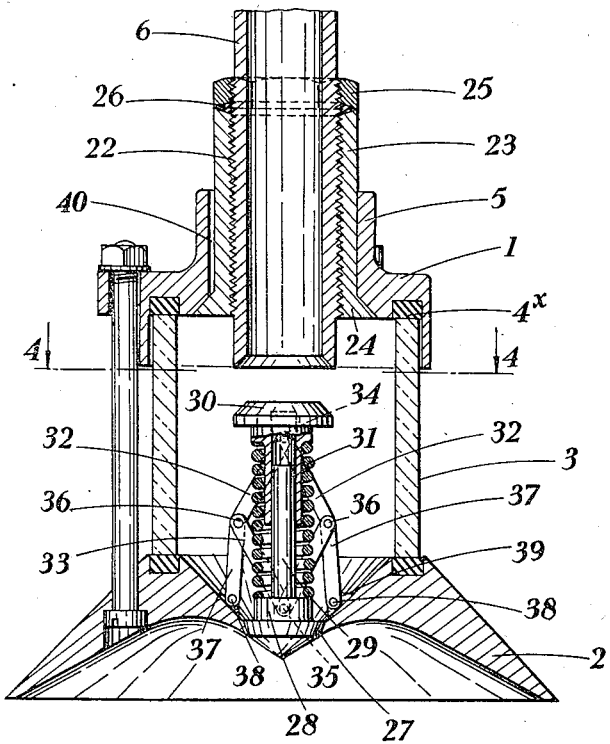
Figure 3 is a vertical section of a further embodiment.
Figure 4:
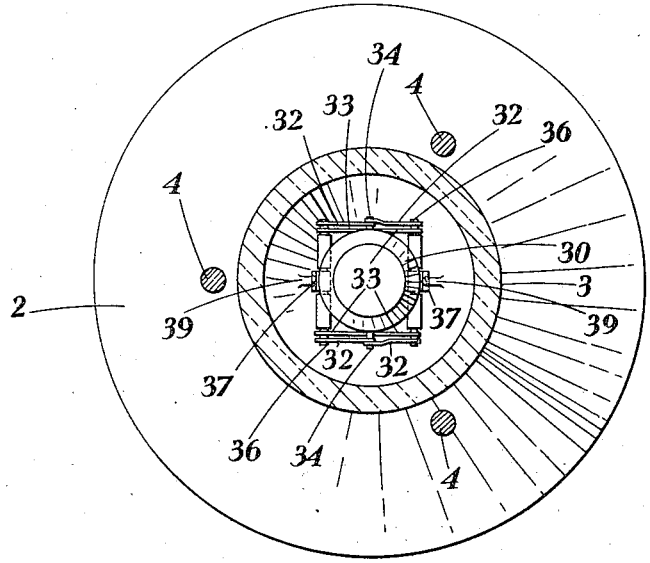
Figure 4 is a transverse section on line 4—4 of Figure 3.

According to the modification illustrated in Figures 3 and 4, the part supporting the measuring vessel may be made adjustable on the delivery pipe 6 so that the capacity of said measuring vessel may be varied within predetermined limits and to this end the delivery pipe 6 adjacent the lower end thereof is provided with a screw thread 22 on which is mounted a sleeve 23, the lower end of which is provided with an annular ring 24, the upper face of which is cut at an angle to form a seating for a correspondingly formed face on the upper plate 1 which with its extension 5 is slidably mounted on the sleeve 23. The sleeve 23 is locked in any desired position on the pipe 6 by means of a lock-nut 25, a ring of packing 26 being interposed between the two parts as shown.

In this embodiment the valve mechanism comprises a valve head 27 adapted to coact with a valve seating provided in the lower end plate 2. The valve head 27 is provided on its upper face with a cylindrical part 28 and stem 29 on the upper end of which is slidably mounted a stop-member 30, a spring 31 being placed between the part 28 and a shoulder on the stop-member 30. The stop-member 30 is maintained in the desired position by a type of lazy-tongs device comprising two oppositely disposed pairs of links 32 and 33. The adjacent ends of the links 32 are pivotally mounted on pins 34 provided on the stop-member 30 and the adjacent ends of the links 33 are pivotally mounted on pins 35 on the part 28. The other ends of the links 32, 33 are pivotally mounted on horizontally disposed pins 36 on the centres of which are pivoted the two vertical links 37, the lower ends of which are pivoted at 38 on lugs 39 provided on the inner face of the end plate 2.

In operation when the vessel into which the liquid is to be discharged is placed beneath the plate 2 and is pressed upwardly against same the measuring vessel slides upwardly as a whole on the sleeve 23 and immediately the joint between the ring 24 and the plate 1 is broken air is free to pass into the chamber 18 through the groove 40 provided in the extension 5, continued upward movement brings the top of the stop-member 30 into contact with and closes the lower end of the delivery tube 6, continued upward movement of the measuring vessel causes the lazy-tongs device to expand laterally so that the stem 29 of the valve moves upwardly in the stop-member 30, thereby lifting the valve 27 off its seat, thus enabling the liquid in the chamber 18 to be discharged. On the removal of the vessel into which the liquid has been discharged the valve is again forced onto its seat followed by the removal of the stop-member 30 from contact with the end of the delivery tube 6, thereby permitting further liquid to flow into the chamber 18 until it reaches the end of the pipe 6, the air in the measuring vessel passing up the pipe 6 as above described.

What I claim is:—

1. A device for delivering measured quantities of liquids comprising in combination a delivery tube adapted to be fitted to the outlet of a closed liquid container, a measuring vessel having a limited vertical movement on said tube, said measuring vessel comprising two horizontally disposed end plates, a vertically disposed cylindrical member arranged between said end plates, means for forming an airtight joint between said delivery tube and measuring vessel, means for maintaining a liquid-tight joint between said cylindrical member and end plates, means for securing the parts in assembled relationship, a spring controlled valve located within said measuring vessel, a valve seating provided on the lowermost plate with which said valve coacts and a stop-member mounted on said valve adapted to coact with and close the inner end of the delivery tube when said measuring vessel is forced upwardly on said delivery tube for the purpose of removing the valve from its seat to discharge the contents of said vessel.

2. A device for delivering measured quantities of liquids comprising in combination a delivery tube adapted to be fitted to the outlet of a closed liquid container, a measuring vessel having a limited vertical sliding movement on said tube, means for forming an air-tight joint between said delivery tube and measuring vessel, a spring controlled valve within said vessel coaxially disposed with respect to said delivery tube, said valve comprising a valve head, a stem on the upper face of said head, a spider-frame mounted on the inner face of the lower end plate in which said valve stem slides, a stop-member mounted on the upper end of said stem and a coiled spring mounted between said stop-member and spider-frame for drawing the valve onto its seat, said parts being so arranged that when the measuring vessel is forced upwardly the stop-member is pressed against and closes the inner end of the delivery tube, the continued upward movement of said measuring chamber effecting the removal of the valve from its seat.

3. A device for delivering measured quantities of liquids comprising in combination a delivery tube adapted to be fitted to the outlet of a closed liquid container, a measuring vessel having a limited vertical sliding movement on said tube, means for forming an air-tight joint between said delivery tube and measuring vessel, a spring controlled valve within said vessel coaxially disposed with respect to said delivery tube, said valve comprising a valve head, a cylindrical part on the upper face thereof, an upwardly directed stem, a stop-member slidably mounted thereon, a spring located between said cylindrical part and stop-member and a lazy-tongs device pivotally mounted on said parts and on the lower end plate, said parts being so arranged that when the measuring vessel is forced upwardly the stop-member is brought into contact with and closes the inner end of the delivery tube, the continued upward movement causing the valve stem, through the medium of the lazy-tongs device, to slide upwardly in the stop-member, thereby lifting the valve from its seat.

HARRY BUDD.